US012233679B2

United States Patent
Dari et al.

(10) Patent No.: US 12,233,679 B2
(45) Date of Patent: Feb. 25, 2025

(54) SEMI-RIGID AXLE FOR A VEHICLE

(71) Applicant: Ford Global Technologies, LLC, Dearborn, MI (US)

(72) Inventors: Ali Dari, Cologne (DE); Andreas Hinz, Frechen (DE); Jens Glorer, Pulheim (DE); Thelu Gopi, Chennai (IN); Tobias Nowak, Dearborn, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 267 days.

(21) Appl. No.: 17/722,814

(22) Filed: Apr. 18, 2022

(65) Prior Publication Data
US 2022/0332161 A1    Oct. 20, 2022

(30) Foreign Application Priority Data
Apr. 20, 2021    (DE) .......................... 102021109912.9

(51) Int. Cl.
*B60G 21/05*    (2006.01)

(52) U.S. Cl.
CPC ............ *B60G 21/05* (2013.01); *B60G 21/051* (2013.01); *B60G 21/052* (2013.01)

(58) Field of Classification Search
CPC ..... B60G 21/05; B60G 21/051; B60G 21/052
See application file for complete search history.

(56) References Cited

U.S. PATENT DOCUMENTS

2007/0108714 A1    5/2007    Kim et al.
2010/0301579 A1    12/2010    Smith et al.

FOREIGN PATENT DOCUMENTS

| DE | 19643001 A1 | 4/1998 | |
|----|----|----|----|
| EP | 2674309 B1 | 11/2014 | |
| JP | 2001088525 A | * 4/2001 | ........... B60G 21/051 |
| JP | 2018052232 A | 4/2018 | |

OTHER PUBLICATIONS

JP-2001088525-A (machine translation) (Year: 2001).*

* cited by examiner

*Primary Examiner* — Jason D Shanske
*Assistant Examiner* — Joselynn Y Sliteris
(74) *Attorney, Agent, or Firm* — Burr & Forman LLP; Lorne Forsythe

(57) ABSTRACT

A semi-rigid axle for a vehicle may include a torsion profile, which extends in a Y direction and is open downward in a Z direction; and two longitudinal control arms, which are connected to the semi-rigid axle and are each connected to the torsion profile by a gusset plate arrangement. Each gusset plate arrangement has a first gusset plate welded to one of the two longitudinal control arms and a second gusset plate arranged at least partially above the first gusset plate. First and second connecting sections of the first and second gusset plates are connected to one another and each of the first and second gusset plates is welded to an inside of the torsion profile on both sides in an X direction.

12 Claims, 3 Drawing Sheets

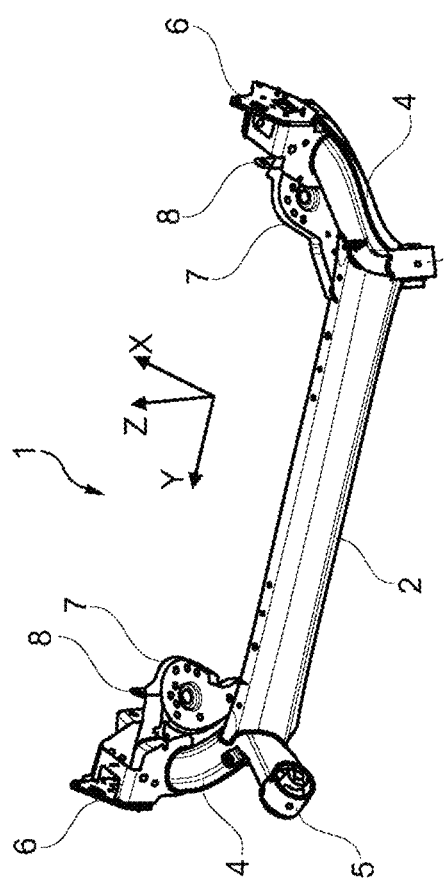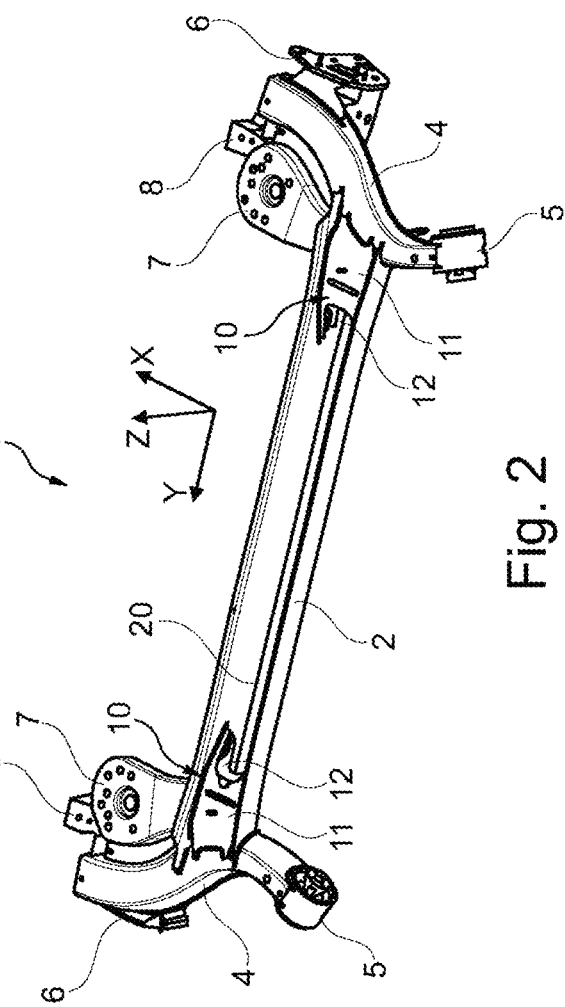

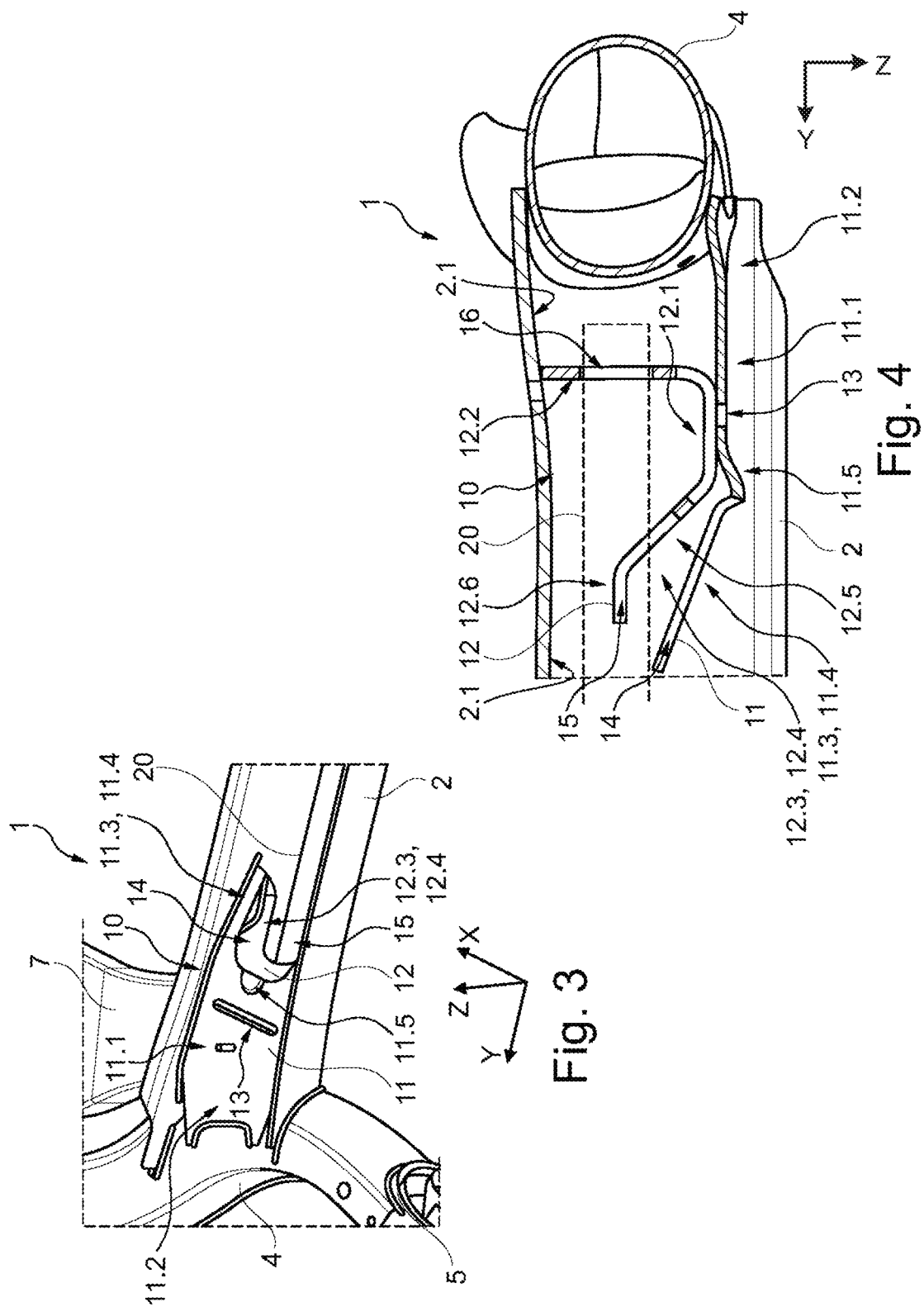

SEMI-RIGID AXLE FOR A VEHICLE

TECHNICAL FIELD

Example embodiments generally relate to a semi-rigid axle for a vehicle.

BACKGROUND

In motor vehicles, a wide variety of suspensions for the wheels of the vehicle are known. In particular, a distinction may be drawn between independent wheel suspension, which is nowadays the predominant type used in passenger cars, and rigid axle suspension, which is used primarily for the rear axles of commercial vehicles. However, there are also what are referred to as "semi-rigid axles", on which the wheels provided at each end of an axle or their wheel carriers are attached to two longitudinal control arms, which are connected pivotably to the vehicle body, usually the chassis, at the body end. In this case, the two longitudinal control arms are connected to one another by a torsion profile, which extends in the transverse direction and is also referred to as a crossmember or axle bridge. The latter is designed to be stiff in bending but flexible in torsion, and the axle bridge therefore transmits a torque between the longitudinal control arms in the manner of a stabilizer in the event of nonuniform inward deflection of said arms. Depending on the position of the torsion profile along the longitudinal control arms, a distinction is drawn between a twist-beam axle (torsion profile closer to the body end) and a torsion crank axle (torsion profile at the end remote from the body). Apart from receiving the wheel carriers, the longitudinal control arms often also serve to support springs and spring dampers.

In the case of a typical semi-rigid axle, the torsion profile is designed as a U-shaped profile and is welded at the ends to the longitudinal control arms. In order to improve the attachment of the respective longitudinal control arm to the torsion profile, the two parts are often connected to one another directly and additionally by a gusset plate or reinforcing plate. One known practice in this context is to weld such a gusset plate to the inside of the torsion profile. One major problem results from the fact that those parts of the torsion profile which are further away from the longitudinal control arm are subject, as intended, to substantial deformation by torsion, while the parts adjoining the longitudinal control arm and the longitudinal control arm itself are not deformed, or are deformed only slightly. The gusset plate thus connects regions which are hardly deformed at all with regions which are severely deformed. This leads to considerable loading of the gusset plate itself and of the weld seams by means of which the gusset plate is connected to the torsion profile. This problem can be alleviated by extending the gusset plate in the transverse direction of the vehicle, thereby enabling the load to be distributed over a larger area, or by using a gusset plate of complex shape. In the former case, a lot of material is used for the gusset plate and weld seams, and the gusset plate also extends far toward the center of the vehicle and thus takes up a lot of installation space. In the latter case, the production of the gusset plate is complicated, leading in turn to increased production costs.

DE 196 43 001 A1 shows a twist-beam axle for the rear wheels of motor vehicles, having two longitudinal control arms and a twistable cross strut which is stiff in bending and is connected to said control arms by gusset plates in such a way as to ensure stiffness at the corners. The longitudinal control arms are made of light metal with an open profile part and a closing plate. The gusset plates are at least partially integrally formed on the closing plate and on the longitudinal control arm. In particular, the gusset plates, together with the closing plate, can form a closed profile which tapers toward the transverse strut.

US 2010/0301579 A1 discloses a vehicle rear wheel suspension arrangement having a first and second longitudinal control arm and a crossmember which is connected to the latter and extends between them. The crossmember has an open cross section of uniform shape which extends over the length of the crossmember, and a rearwardly directed opening, the shear center of the crossmember being arranged adjacent to the upper end of the open cross section of the crossmember. The first and second gusset plates are internally connected to the crossmember at a first end and to the first and second longitudinal control arms at a second end. The open cross section of the crossmember can be U-shaped, as can that of a first end of the first and second gusset plates.

US 2007/0108714 A1 discloses a rear wheel suspension system, consisting of a plurality of longitudinal control arms, which are each connected to a rear wheel, a beam, which connects the longitudinal control arms to one another and defines a space therein, and a plurality of reinforcing elements. Each reinforcing element has a first end, which is in each case connected to one of the longitudinal control arms, a second end, which touches an inner surface of the beam, and at least one curved portion. It is also possible to provide two curved portions.

EP 2 674 309 B1 discloses a twist-beam axle for a motor vehicle. This has a torsion profile, with longitudinal swing arms arranged on the ends of the torsion profile. The torsion profile is of C-shaped or U-shaped configuration in cross section. At each end, in an inner region, a reinforcing plate is thermally joined to the insides of the legs. The reinforcing plate has a relief slot, wherein it is possible, in particular, for the relief slot to be oriented in the direction of a central longitudinal axis of the torsion profile. It is closed by thermal joining.

JP 2018-052232 A shows a wheel suspension with longitudinal control arms, which are arranged on the left and right, a crossmember, the ends of which are fastened to the longitudinal control arms, and reinforcing elements, the base end sides of which are fastened to the longitudinal control arms and the tip sides of which are fastened to the crossmember. The reinforcing elements comprise a plurality of projections on their base end sides, wherein the projections taper in the direction of the base ends sides of the reinforcing elements and are welded to the longitudinal control arms.

In view of the disclosures discussed above, the connection of longitudinal control arms to a torsion profile of a semi-rigid axle certainly still leaves room for improvements

BRIEF SUMMARY OF SOME EXAMPLES

Some example embodiments may optimize the connection of longitudinal control arms to a torsion profile of a semi-rigid axle. Example embodiments may provide a semi-rigid axle for a vehicle. In particular, the rear axle suspension is provided for motor vehicles such as trucks or passenger cars. However, use for trailers is also possible, for example. The semi-rigid axle has a torsion profile, which extends in the Y direction and is open downward in the Z direction, and two longitudinal control arms, which are connected thereto and are each connected to the torsion profile by a gusset plate arrangement. The torsion profile, which can also be referred to as a crossmember or axle bridge, extends in the Y direction or along the Y axis (transverse axis) of the vehicle. Here and in the rest of the document, all statements with regard to the X, Y and Z directions relate to the correctly installed state of the semi-rigid axle within the vehicle. The torsion profile may extend parallel to the Y axis, at least in some section or sections, but may also extend at least partially at an angle to the Y axis. It is open downward in the Z direction, or, in other words, it has an inner space which is open downward. Normally, the torsion profile is formed by a downwardly open U-profile (or C-profile).

BRIEF DESCRIPTION OF THE SEVERAL VIEWS OF THE DRAWING(S)

Having thus described the invention in general terms, reference will now be made to the accompanying drawings, which are not necessarily drawn to scale, and wherein:

FIG. 1 shows a perspective plan view of a semi-rigid axle according of an example embodiment;

FIG. 2 illustrates a perspective bottom view of the semi-rigid axle of FIG. 1 according to of an example embodiment;

FIG. 3 shows an enlarged detail view of FIG. 2 according to an example embodiment;

FIG. 4 illustrates a section through part of the semi-rigid axle of FIG. 1 according to an example embodiment.

DETAILED DESCRIPTION

Figure 5:
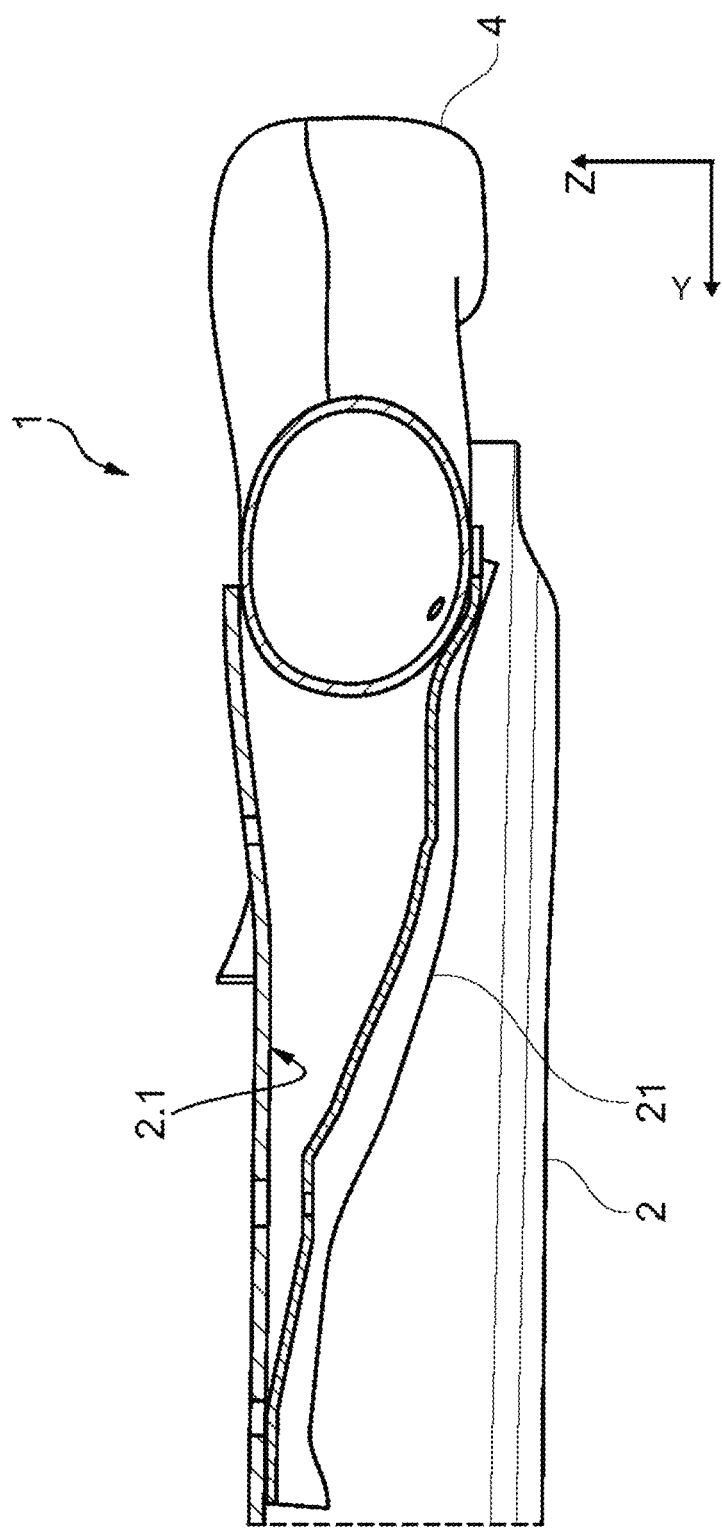
FIG. 5 shows a section through a semi-rigid axle according to the prior art.

Some example embodiments now will be described more fully hereinafter with reference to the accompanying drawings, in which some, but not all example embodiments are shown. Indeed, the examples described and pictured herein should not be construed as being limiting as to the scope, applicability or configuration of the present disclosure. Rather, these example embodiments are provided so that this disclosure will satisfy applicable legal requirements. Like reference numerals refer to like elements throughout. Furthermore, as used herein, the term "or" is to be interpreted as a logical operator that results in true whenever one or more of its operands are true. As used herein, operable coupling should be understood to relate to direct or indirect connection that, in either case, enables functional interconnection of components that are operably coupled to each other. It should be noted that the features and measures presented individually in the following description can be combined in any technically feasible manner, giving rise to further embodiments of the invention. The description additionally characterizes and specifies aspects of some example embodiments, particularly in conjunction with the figures.

As noted above, example embodiments may provide a semi-rigid axle having a torsion profile, which extends in the Y direction and is open downward in the Z direction, and two longitudinal control arms, which are connected thereto and are each connected to the torsion profile by a gusset plate arrangement. The torsion profile, which can also be referred to as a crossmember or axle bridge, extends in the Y direction or along the Y axis (transverse axis) of the vehicle. Here and in the rest of the document, all statements with regard to the X, Y and Z directions relate to the correctly installed state of the semi-rigid axle within the vehicle. The torsion profile may extend parallel to the Y axis, at least in some section or sections, but may also extend at least partially at an angle to the Y axis. It is open downward in the Z direction, or, in other words, it has an inner space which is open downward. Normally, the torsion profile is formed by a downwardly open U-profile (or C-profile).

The longitudinal control arms are connected to the torsion profile and are thus also (indirectly) connected to one another by the torsion profile. They extend along the X axis, and they may extend forwardly and/or rearwardly beyond the torsion profile, depending on the design of the semi-rigid axle. In this arrangement, the longitudinal control arms, which can be produced in one or more parts, do not have to extend parallel to the X axis, but can extend at an angle thereto, at least in some section or sections. Overall, however, they extend along the X axis, and it is therefore possible to refer to a "front end" and a "rear end" of the respective longitudinal control arm. In the assembled state, each longitudinal control arm serves for the attachment of a wheel carrier, which in turn serves to receive a wheel of the vehicle. The corresponding wheel carrier attachment region is usually arranged in a rear part of the longitudinal control arm, for example in the rear third of the latter. In the installed state, the semi-rigid axle is mounted so as to be pivotable on a vehicle body, the term "vehicle body" here serving as a collective term for the body, the chassis and optionally a subframe. The semi-rigid axle is usually mounted on a chassis of the vehicle. Mounting can be provided by elastic bearings, e.g. rubber-metal bearings. The corresponding pivot axis extends in the Y direction, parallel to the transverse axis of the vehicle. In particular, the semi-rigid axle can be designed as a twist-beam axle, wherein the torsion profile is arranged in the X direction between the pivot axis mentioned and the wheel carrier attachment regions.

As is customary in the case of twist-beam axles, the torsion profile is preferably designed to be stiff in bending but at least partially flexible in torsion, while the longitudinal control arms are preferably designed to be stiff with respect to bending and torsion. Both the torsion profile and the longitudinal control arms can be of straight design, but can also be of curved and/or angled design, at least in some section or sections. They are normally formed from metal, in particular steel, and can be manufactured from one or more shaped sheet-metal parts, for example.

On the one hand, the longitudinal control arms are directly connected to the torsion profile, as a rule by welding. On the other hand, each longitudinal control arm is additionally connected indirectly to the torsion profile by a respective gusset plate arrangement. The gusset plate arrangement, which can also be referred to as a connecting arrangement or as a reinforcing arrangement, serves primarily to reinforce or stabilize the connection between the torsion profile and the respective longitudinal control arm.

According to an example embodiment, each gusset plate arrangement has a first gusset plate welded to a longitudinal control arm and a second gusset plate arranged at least partially above said first gusset plate, wherein connecting sections of the gusset plates are connected to one another and each gusset plate is welded to the inside of the torsion profile on both sides in the X direction. That is to say that each gusset plate arrangement has (at least) two gusset plates. The gusset plates are formed from metal, in particular steel, and are normally shaped sheet-metal parts, which can be manufactured from a blank by punching and subsequent cold- and/or hot forming.

Each gusset plate has a connecting section, which is connected to a connecting section of the respective other gusset plate. The connecting sections are preferably welded to one another, although other connecting methods are possible within the scope of the invention. The second gusset plate is arranged at least partially over the first gusset plate or above the first gusset plate, this statement relating, of course, to the arrangement along the Z axis. The second gusset plate is preferably arranged predominantly or completely above the first gusset plate, which means that, with respect to a specific point of the first gusset plate within the X-Y plane, the corresponding point of the second gusset plate (if it has material there) is arranged higher along the Z axis. In each case, it can be stated that the two gusset plates are arranged at least partially at different heights or in different planes with respect to the Z axis.

In this case, each gusset plate is welded to the inside of the torsion profile on both sides in the X direction (longitudinal direction of the vehicle). In other words, the respective gusset plate is welded to the torsion profile on the front side and rear side (or at the front and rear), more specifically on the inside or on an inner side of the torsion profile. Accordingly, each gusset plate is arranged at least partially within the torsion profile or within the abovementioned inner space of the torsion profile. By virtue of the welded joints with the torsion profile on both sides, each gusset plate is connected to the torsion profile in a stable manner. The first gusset plate is also connected directly to the longitudinal control arm, while the second gusset plate is connected at least indirectly to the longitudinal control arm via the first gusset plate. To this extent, both gusset plates contribute to the indirect connection between the longitudinal control arm and the torsion profile. In particular, an outer section of the first gusset plate, which is arranged on the outside of the connecting section in the Y direction, can be welded to the longitudinal control arm. The corresponding outer section can rest at least partially on the underside of the longitudinal control arm in the Z direction.

It may be expedient to arrange the two gusset plates at different heights with respect to the Z axis. That is to say, two different connection planes may be established within the torsion profile. If torsion of the semi-rigid axle or of the torsion profile occurs during driving, the stresses which arise are as it were distributed between these two connecting planes. In other words, the stresses are distributed between the two gusset plates and between the associated weld seams. It has been found that in this way a gusset plate arrangement which is of comparatively short design in the Y direction can withstand similar or even higher loads than a single gusset plate which extends significantly further in the Y direction. The overall extent in the Y direction can be significantly reduced in comparison with a single gusset plate, for example by at least 30% or even by at least 50%, based on a conventional gusset plate. Accordingly, there remains a larger installation space within the torsion profile toward the center of the vehicle. By virtue of the shorter design of the gusset plate arrangement, there is only an insignificant increase in the expenditure of material for two gusset plates in comparison with an individual gusset plate capable of bearing similar loads, or it may even be reduced in some embodiments. The same applies to the total length of the weld seams to be applied. Since the gusset plate arrangement extends less far toward the center of the vehicle, the mechanical properties of the torsion profile are also less strongly influenced. A comparatively small part of the torsion profile is impaired in its torsional flexibility by the connection to the gusset plate arrangement.

It may be beneficial in some cases if each gusset plate has an inner section which, on the inside of its connecting section in the Y direction, is welded to the inside of the torsion profile on both sides in the X direction, wherein the inner sections of the two gusset plates are spaced apart from one another in the Z direction. While the connecting sections of the gusset plates are connected to one another and thus as a rule bear at least partially against one another, in this embodiment an inner section is formed on the inside in the Y direction, that is to say toward the center plane or center of the vehicle, which inner section is welded to the torsion profile on both sides in the X direction, that is to say on the front and rear sides. This expressly does not exclude that, in the case of at least one gusset plate, the connecting section is also welded to the inside of the torsion profile. The inner section can directly or indirectly adjoin the connecting section in the Y direction. The inner sections welded on as described are spaced apart from one another in the Z direction, wherein, of course, the inner section of the second gusset plate is arranged over the inner section of the first gusset plate. By means of such a spacing, the described distribution of the stresses can be improved. The distance between the two inner sections can increase, at least in some section or sections, toward the center of the vehicle.

At least one gusset plate may have an inner section on the inside of its connecting section in the Y direction, which inner section has two wing sections, which are separated in the X direction by a recess and are in each case welded to the inside of the torsion profile. In this embodiment, the inner section of the respective gusset plate may also be described as "fork-shaped". It has two wing sections separated in the X direction, wherein one (front) wing section is welded to the front and the other (rear) wing section is welded to the rear of the torsion profile. A recess is formed between the two wing sections. The fork-shaped configuration of the inner section serves primarily to reduce the torsional rigidity of the semi-rigid axle in this region. The two mutually separate wing sections impede the torsion significantly less than a continuous sheet-metal section. However, the installation space provided by the recess can also be used to accommodate a further component, as will be explained below. According to a preferred embodiment, both gusset plates have an inner section, described here, with two wing sections. Each wing section preferably tapers continuously and/or discontinuously inward in the Y direction, i.e. toward the center of the vehicle.

It may be beneficial in some cases if the wing sections extend upward obliquely to the Y direction, at least in some section or sections. That is to say, if the course of the respective wing section toward the center of the vehicle in the Y direction is considered, it is not continuously parallel to the Y direction but runs obliquely upward, that is to say diagonally within the Y-Z plane, at least in some section or sections. This can advantageously be combined with the embodiment described above, in which the wing sections of the two gusset plates are spaced apart from one another in the Z direction. In this case, the wing sections of the first gusset plate can have a smaller inclination with respect to the Y direction than the wing sections of the second gusset plate, at least in some section or sections. In this way, the distance between the wing sections increases, it being possible for said distance to be at a minimum on a side facing the connecting section. The inclination of the wing sections with respect to the Y direction can be between 20° and 70°, at least in some section or sections.

The inclination of a wing section can be constant along its entire length. However, it can also be different in some section or sections. According to one embodiment, the wing sections of the second gusset plate have a first subsection, extending obliquely to the Y direction and, on the inside thereof in the Y direction, a second subsection extending less obliquely to the Y direction. Within the two subsections, the inclination with respect to the Y direction can be constant. The first subsection extends obliquely to the Y direction, for example at an angle between 30° and 60°, while the second subsection extends less obliquely to the Y direction, for example at an angle between 0° and 20°. One function of the greater inclination of the first subsection can be to produce a large distance in the Z direction, over a comparatively short distance in the Y direction, with respect to the wing section of the first gusset plate lying underneath. Thus, the torsional load can be shifted to a relatively great extent from the first gusset plate to the second gusset plate. Moreover, the production process can be simplified, in particular in respect of weldability, since the second gusset plate is kept further away from greatly deformed regions of the torsion profile.

The downwardly open torsion profile has an apex region, which is the region arranged at the highest point in the Z direction. In the case of a single gusset plate in the prior art, this gusset plate is often taken as far as the apex region and welded on there. In contrast to this, it is preferred in the invention that the wing sections of at least one gusset plate are spaced apart from the apex region of the torsion profile in the Z direction. That is to say the wing sections are not continued upward as far as the apex region but already end below it. Accordingly, the apex region remains free, and this can have an advantageous effect under certain circumstances as regards the installation space and as regards the torsional properties. A distance in the Z direction between the wing sections and the apex region can correspond to at least 20% or at least 30% of the total height of the torsion profile.

According to one example embodiment, at least one gusset plate may have an arched portion projecting in the Z direction, adjacent in the Y direction to the recess formed between the wing sections. The arched portion is arranged directly where the respective gusset plate branches into the two wing sections. The arched portion projects in the Z direction, in other words the gusset plate arches forward in the Z direction in this region. In particular, the arched portion can project downward in the Z direction. In this case, the arched portion is convex when viewed from below or concave when viewed from above. In particular, a corresponding arched portion can be formed on the first gusset plate.

While the first gusset plate is welded to the longitudinal control arm as described, for example by means of its outer section, the second gusset plate can be spaced apart from the longitudinal control arm in the Y direction. That is to say that there is an interspace between the second gusset plate and the longitudinal control arm. This interspace can be bounded at the bottom at least partially by the first gusset plate and at the top by the apex region of the torsion profile.

The second gusset plate can have an upwardly extending outer section on the outside of its connecting section in the Y direction, which outer section is in each case welded to the inside of the torsion profile on both sides in the X direction and on the top side. The corresponding outer section is at least partially angled relative to the connecting section, wherein the transition can be continuous or discontinuous. While the connecting section can extend at an angle of less than 20° with respect to the Y direction, the outer section can, for example, extend at an angle of more than 70° or more than 80° with respect to the Y direction, for example also perpendicularly thereto. In this case, the outer section is welded to the inside of the torsion profile on both sides in the X direction, that is to say on the front and rear sides. In addition, however, it is also welded to the top of the torsion profile, it being possible, in particular, for it to be welded to the abovementioned apex region. The outer section is preferably spaced apart (in the Y direction) from the longitudinal control arm. The outer section of the second gusset plate can thus close the abovementioned interspace between the longitudinal control arm and the second gusset plate on the inside. In this region, a structure which is relatively stable, in particular stiff in bending and in torsion, can be obtained, said structure being formed on the outside by the longitudinal control arm, on the inside by the outer section of the second gusset plate, at the bottom by the outer section of the first gusset plate, and at the front, rear and top by the torsion profile.

According to a further example embodiment, the outer section can have a recess in which a stabilizer arranged inside the torsion profile and connecting the two gusset plate arrangements and/or the two longitudinal control arms is received. In this case, the recess is normally continuous in the Y direction. Its dimensions can correspond to the dimensions of the stabilizer. The stabilizer is normally made of spring steel and can have a solid or hollow profile. It can be used when the torsional stiffness of the torsion profile is considered to be insufficient for the respective application. It could also be referred to as a secondary torsion profile. One end of the stabilizer is introduced into said recess or passed through it. If the stabilizer connects the two gusset plate arrangements, it is received in the recess in a rotationally fixed manner, i.e. it is not possible to rotate the stabilizer about the Y axis relative to the outer section. This could be achieved, for example, by means of positive engagement between the stabilizer and the outer section. Alternatively (or additionally), the stabilizer can be welded into the recess. In each case, the stabilizer connects the two gusset plate arrangements since it is received in a rotationally fixed manner in a respective recess of a gusset plate arrangement. Since, as described, the outer section is welded at the front, at the rear and at the top to the torsion profile, which in turn is connected to the longitudinal control arm, there is not only torsion of the torsion profile but also of the stabilizer in the event of unequal deflection of the two longitudinal control arms. In addition or as an alternative, the stabilizer can also connect the two longitudinal control arms to one another, being connected (for example welded) to each longitudinal control arm in a rotationally fixed manner. In this case, the stabilizer can be passed through the abovementioned recess without there being a rotationally fixed connection. However, it is also conceivable to provide a rotationally fixed connection both to the gusset plate arrangements and to the longitudinal control arms.

FIGS. 1 to 4 show various views of a semi-rigid axle according to the invention, to be more precise a twist-beam axle 1, which can be used, for example, for a passenger car or a truck. The twist-beam axle 1 is used to attach wheels (not illustrated here) of a vehicle rear axle to a vehicle body (likewise not illustrated).

The twist-beam axle 1 has a torsion profile 2 designed as a U-profile, which extends along the Y direction, to be more precise substantially parallel thereto. At each end, a longitudinal control arm 4 is welded to the torsion profile 2. In this case, the longitudinal control arms 4 are of tubular design and extend along the X direction, although predominantly not parallel thereto, instead having a variable curved shape, generally oblique to the X direction. Both the torsion profile 2 and the longitudinal control arms 4 are made of sheet steel. In accordance with the structure of a twist-beam axle 1, the torsion profile 2 is welded on in a central region of the respective longitudinal control arm 4, i.e. each longitudinal control arm 4 projects beyond the torsion profile 2 in the X direction both toward the front and toward the rear. Welded to a front end of each longitudinal control arm 4 is a bearing bush 5, into which a rubber-metal composite bearing is pressed, serving for pivotable connection to the vehicle body. In a rear region of the longitudinal control arm 4, a wheel carrier 6 is arranged, preferably welded on, said carrier serving to receive a vehicle wheel. In addition, a spring plate 7 for supporting a coil spring (not illustrated here) is welded to the rear region of the longitudinal control arm 4 and to the torsion profile 2, and a damper mount 8 for connection to a spring damper (likewise not illustrated here) is welded to the longitudinal control arm 4 and to the spring plate 7.

Apart from the direct connection between the torsion profile 2 and the respective longitudinal control arm 4, an indirect connection via a gusset plate arrangement 10 is additionally provided. The gusset plate arrangement 10, the precise construction of which can be seen, in particular, from the detail view in FIG. 3 and from the sectional illustration in FIG. 4, has a first gusset plate 11 and a second gusset plate 12 arranged above it in the Z direction. Both gusset plates 11, 12 are likewise made of sheet steel. They are connected to one another via a a first connecting section 11.1 and a second connecting section 12.1, in this example connected to one another via a weld seam, which is applied through a slot 13 within the first connecting section 11.1 of the first gusset plate 11. Both connecting sections 11.1, 12.1 extend predominantly parallel to the X-Y plane. The same applies to a first outer section 11.2 of the first gusset plate, which extends outward from the first connecting section 11.1 (as seen from the center of the vehicle) and is welded to the underside of the longitudinal control arm 4.

On the inside in the Y direction, the connecting section 11.1 is adjoined by an inner section 11.3 with two wing sections 11.4, which are spaced apart in the X direction by a first recess 14. Adjacent in the Y direction to the recess 14 formed between the wing sections 11.4, the first gusset plate 11 furthermore has an arched portion 11.5 projecting downward in the Z direction. Each wing section 11.4 tapers in the Y direction toward the center of the vehicle and is welded to the inside of the torsion profile 2. The corresponding weld seam is continued continuously on the inside of the torsion profile 2 to the connecting section 11.1 and to the outer section 11.2. As can be seen in FIG. 3, the first wing sections 11.4 extend obliquely upward toward the center of the vehicle, extending at an angle of approximately 30° to the Y direction. In this case, there is a considerable distance in the Z direction between the entire first wing section 11.4 and an apex region 2.1 arranged at the uppermost point of the torsion profile 2, which distance corresponds approximately to 50% of the total height of the torsion profile 2.

A second connecting section 12.1 of the second gusset plate 12 is arranged directly above the first connecting section 11.1 of the first gusset plate 11. This second connecting section 12.1 also extends parallel to the X-Y plane. For manufacturing reasons, it is not welded directly to the torsion profile 2. However, on the inside in the Y direction, the second connecting section 11.1-12.1 is adjoined by a second inner section 12.3, which likewise has two second wing sections 12.4, which are separated from one another in the X direction by a second recess 15. In this case, each second wing section 12.4 has a first subsection 12.5, which extends obliquely upward at an angle of approximately 40° to the Y direction, while a second subsection 12.6 adjoining the latter extends parallel to the Y direction. The second wing sections 12.4 are likewise welded to the inside of the torsion profile 2. They extend less far in the Y direction toward the center of the vehicle than the first wing sections 11.4. On the outside, the second connecting section 12.1 is adjoined by a second outer section 12.2, which extends perpendicularly to the Y direction. It is welded to the front, rear and top sides of the torsion profile 2, and, in particular, also to the apex region 2.1 thereof. The second outer section 12.2 is spaced apart from the longitudinal control arm 4 in the Y direction. In this region, a structure which is stiff in bending and in torsion overall is formed, said structure being defined on the outside by the longitudinal control arm 4, on the inside by the second outer section 12.2, at the bottom by the first outer section 11.2, and at the front, rear and top by the torsion profile 2.

In contrast, the separate wing sections 11.4, 12.4 tapering toward the center of the vehicle limit the torsion capacity of the torsion profile 2 only slightly, i.e. this region is designed to be comparatively flexible in torsion. The stresses which arise during torsion in the gusset plates 11, 12 and in the weld seams which connect them to the torsion profile 2 are reduced by the fact that they are distributed between the two gusset plates 11, 12 arranged in different planes. The local stresses within the first gusset plate 11 are furthermore reduced by the arched portion 11.5. For this reason, the extent of the gusset pate-plate arrangement 10 in the Y direction can be selected to be comparatively small. In this example, it corresponds to approximately 130% of the height of the torsion profile 2. In contrast, a single gusset plate 21 of a twist-beam axle according to the prior art, which is illustrated by way of example in FIG. 5, would have to have an extent in the range from 200% to 300% of the height of the torsion profile 2 in order to prevent local stresses from damaging the gusset plate 21 or the connection to the torsion profile 2.

Within the second outer section 12.2, a through-opening 16 is formed, into which a stabilizer 20 (shown only in dashed lines in FIG. 4) is welded. The stabilizer 20 is designed as a rod made of spring steel and can be used as required in order to adjust the torsional rigidity of the twist-beam axle. In the manner described, it is connected in a rotationally fixed manner to the second gusset plate 12 of each gusset plate arrangement 10, with the result that, in the event of unequal deflection of the longitudinal control arms 4, torsion of the torsion profile 2 is also accompanied by torsion of the stabilizer 20. Here, the stabilizer 20 has no direct connection to the longitudinal control arms 4 but is connected to them only indirectly via the gusset plates 11, 12 and the torsion profile 2. Of particular importance here is the transmission of force through the second outer section 12.2, which is assisted by the above-described three-sided welded connection to the torsion profile 2. According to an embodiment not illustrated here, the stabilizer could also be passed through the through-opening 16 as far as the longitudinal control arm 4 and could be connected to the latter in a rotationally fixed manner, e.g. by welding. In this case, the rotationally fixed connection to the second gusset plate 12 could also be dispensed with.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe exemplary embodiments in the context of certain exemplary combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. In cases where advantages, benefits or solutions to problems are described herein, it should be appreciated that such advantages, benefits and/or solutions may be applicable to some example embodiments, but not necessarily all example embodiments. Thus, any advantages, benefits or solutions described herein should not be thought of as being critical, required or essential to all embodiments or to that which is claimed herein. Although specific terms are employed herein, they are used in a generic and descriptive sense only and not for purposes of limitation.

That which is claimed:

1. A semi-rigid axle for a vehicle comprises:
   a torsion profile, which extends in a Y direction and is open downward in a Z direction; and
   two longitudinal control arms, which are connected to the semi-rigid axle and are each connected to the torsion profile by a gusset plate arrangement,
      wherein each gusset plate arrangement has a first gusset plate attached to one of the two longitudinal control arms and a second gusset plate arranged at least partially above the first gusset plate, and
      wherein, for each gusset plate arrangement, first and second connecting sections of the first and second gusset plates are connected to one another and each of the first and second gusset plates is attached to an inside of the torsion profile on both sides in an X direction,
      wherein each of the second gusset plates is spaced apart from a corresponding one of the two longitudinal control arms in the Y direction.

2. The semi-rigid axle according to claim 1, wherein, for each gusset plate arrangement, the first and second gusset plates each have an inner section which, on an inner portion of the first and second connecting sections away from the corresponding one of the two longitudinal control arms, in the Y direction, is attached to the inside of the torsion profile on both sides in the X direction, and
   the inner sections of the first and second gusset plates are spaced apart from one another in the Z direction.

3. The semi-rigid axle according to claim 1, wherein at least one of the first gusset plates or the second gusset plates has an inner section on an inner portion of a corresponding one of the first and second connecting sections away from the corresponding one of the two longitudinal control arms in the Y direction,
   wherein the inner section has two wing sections, which are separated in the X direction by a recess, and
   wherein each of the two wing sections is attached to the inside of the torsion profile.

4. The semi-rigid axle according to claim 3, wherein the two wing sections each extend upward toward an apex region of the torsion profile obliquely to the Y direction, at least in some portion or portions,
   wherein the apex region of the torsion profile is a furthest portion of the torsion profile away from a driving surface of the vehicle.

5. The semi-rigid axle according to claim 3, wherein the two wing sections of the second gusset plate have a first subsection extending obliquely to the Y direction and, further inside of the second gusset plate in the Y direction away from the corresponding one of the two longitudinal control arms, a second subsection extending less obliquely to the Y direction.

6. The semi-rigid axle according to claim 3, wherein the two wing sections of the at least one of the first gusset plates or the second gusset plates are spaced apart in the Z direction from an apex region of the torsion profile,
   wherein the apex region of the torsion profile is a furthest portion of the torsion profile away from a driving surface of the vehicle.

7. The semi-rigid axle according to claim 3, wherein the at least one of the first gusset plates or the second gusset plates of has an arched portion projecting in the Z direction and is proximate to the recess formed between the two wing sections.

8. The semi-rigid axle according to claim 1, wherein, for each gusset plate arrangement, the second gusset plate has an upwardly extending outer section on an outer portion of the second connecting section in the Y direction, and
   wherein the outer section is attached to the inside of the torsion profile on a top side.

9. The semi-rigid axle according to claim 8, wherein, for each gusset plate arrangement, the outer section has a recess in which a stabilizer, which is arranged inside the torsion profile and is connecting each gusset plate arrangement and the two longitudinal control arms, is received.

10. A semi-rigid axle for a vehicle comprises:
    a torsion profile, which extends in a Y direction and is open downward in a Z direction; and
    two longitudinal control arms, which are connected to the semi-rigid axle and are each connected to the torsion profile by a gusset plate arrangement,
       wherein each gusset plate arrangement has a first gusset plate attached to one of the two longitudinal control arms and a second gusset plate arranged at least partially above the first gusset plate,
       wherein, for each gusset plate arrangement, first and second connecting sections of the first and second gusset plates are connected to one another and each of the first and second gusset plates is attached to an inside of the torsion profile on both sides in an X direction,
       wherein, for each gusset plate arrangement, at least one of the first gusset plate or the second gusset plate has an inner section on an inner portion of a corresponding one of the first and second connecting sections away from the corresponding one of the two longitudinal control arms in the Y direction,
       wherein, for each gusset plate arrangement, the inner section has two wing sections, which are separated in the X direction by a recess, and
       wherein each of the two wing sections is attached to the inside of the torsion profile.

11. The semi-rigid axle according to claim 10, wherein, for each gusset plate arrangement, the second gusset plate is spaced apart from the corresponding one of the two longitudinal control arms in the Y direction.

12. A semi-rigid axle for a vehicle comprises:
    a torsion profile, which extends in a Y direction and is open downward in a Z direction; and
    two longitudinal control arms, which are connected to the semi-rigid axle and are each connected to the torsion profile by a gusset plate arrangement,
       wherein each gusset plate arrangement has a first gusset plate attached to one of the two longitudinal control arms and a second gusset plate arranged at least partially above the first gusset plate, wherein, for each gusset plate arrangement, first and second connecting sections of the first and second gusset plates are connected to one another and each of the first and second gusset plates is attached to an inside of the torsion profile on both sides in an X direction, wherein, for each gusset plate arrangement, the second gusset plate has an upwardly extending outer section on an outer portion of the second connecting section in the Y direction, and wherein, for each gusset plate arrangement, the outer section is attached to the inside of the torsion profile on a top side.

\* \* \* \* \*

UNITED STATES PATENT AND TRADEMARK OFFICE
CERTIFICATE OF CORRECTION

| | | |
|---|---|---|
| PATENT NO. | : 12,233,679 B2 | Page 1 of 1 |
| APPLICATION NO. | : 17/722814 | |
| DATED | : February 25, 2025 | |
| INVENTOR(S) | : Ali Dari et al. | |

It is certified that error appears in the above-identified patent and that said Letters Patent is hereby corrected as shown below:

In the Claims

In Column 12, Claim 7, Line 14, "plates of has" should read as -- plates has --

In Column 12, Claim 10, Line 47, "from the corresponding" should read as -- from a corresponding --

Signed and Sealed this
Third Day of June, 2025

Coke Morgan Stewart
*Acting Director of the United States Patent and Trademark Office*